(12) United States Patent
Yokomizo (10) Patent No.: US 10,748,046 B2
(45) Date of Patent: Aug. 18, 2020

(54) CONSUMABLE-COMPONENT MANAGEMENT APPARATUS, CONTROL METHOD, AND STORAGE MEDIUM STORING PROGRAM

(71) Applicant: CANON KABUSHIKI KAISHA, Tokyo (JP)

(72) Inventor: So Yokomizo, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/271,568

(22) Filed: Feb. 8, 2019

(65) Prior Publication Data
US 2019/0266456 A1 Aug. 29, 2019

(30) Foreign Application Priority Data
Feb. 27, 2018 (JP) .................. 2018-033048

(51) Int. Cl.
*G06F 3/12* (2006.01)
*G06K 15/00* (2006.01)
*G06Q 10/08* (2012.01)

(52) U.S. Cl.
CPC ....... *G06K 15/4075* (2013.01); *G06F 3/1204* (2013.01); *G06F 3/1229* (2013.01); *G06Q 10/087* (2013.01)

(58) Field of Classification Search
CPC .............. G03G 15/556; G03G 15/502; G03G 15/0856; G03G 15/0863; G03G 15/5016; G03G 15/5079; G03G 2221/16631; G06K 15/4075; G06F 3/1204; G06F 3/1229; H04N 1/2393; G06Q 10/097
See application file for complete search history.

(56) References Cited

U.S. PATENT DOCUMENTS

| | | | | |
|---|---|---|---|---|
| 10,367,955 | B2 * | 7/2019 | Hitaka | G03G 15/55 |
| 2012/0020682 | A1 * | 1/2012 | Ikeda | G03G 15/55 |
| | | | | 399/24 |
| 2013/0030822 | A1 * | 1/2013 | Mikan | G06Q 30/02 |
| | | | | 705/1.1 |
| 2019/0227475 | A1 * | 7/2019 | Tachibana | G03G 15/0856 |
| 2019/0235434 | A1 * | 8/2019 | Kawaguchi | G03G 15/502 |

FOREIGN PATENT DOCUMENTS

JP 2007-268739 A 10/2007

* cited by examiner

*Primary Examiner* — Gabriel I Garcia
(74) *Attorney, Agent, or Firm* — Canon U.S.A., Inc. IP Division (57) ABSTRACT

A consumable-component management apparatus equipped with a plurality of consumable components, includes a display that displays information, and at least one controller configured to acquire a first value in units of days based on usage information regarding a first consumable component, acquire a second value in units of days based on usage information regarding a second consumable component, and cause the display to display a screen on which pieces of identification information regarding the plurality of consumable components are arranged, wherein an instruction object is disposed on the screen, the instruction object enabling a change in arrangement order between the identification information regarding the first consumable component and the identification information regarding the second consumable component based on a magnitude relationship between the first value and the second value.

26 Claims, 7 Drawing Sheets

| CONSUMABLE-COMPONENT NAME | GROUP | MODEL NUMBER |
|---|---|---|
| COMPONENT A-1 | 1 | TAK-1 |
| COMPONENT A-2 | 1 | TAK-2 |
| COMPONENT A-3 | 1 | TAK-3 |
| COMPONENT A-4 | 1 | TAK-4 |
| COMPONENT B-1 | 1 | KYO-1 |
| COMPONENT B-2 | 1 | KYO-2 |
| COMPONENT C | 2 | KEI-1 |
| COMPONENT X | 0 | MAY-1 |
| COMPONENT Y | 3 | MAY-2 |
| COMPONENT Z | 1 | MAY-3 |
| ⋮ | ⋮ | ⋮ |

FIG. 4

<GROUP DISPLAY SETTING> 1/2

| CONSUMABLE-COMPONENT NAME | GROUP | SETTING RANGE |
|---|---|---|
| COMPONENT A-1 | 1 | 0-3 |
| COMPONENT A-2 | 1 | 0-3 |
| COMPONENT A-3 | 1 | 0-3 |
| COMPONENT A-4 | 1 | 0-3 |
| COMPONENT B-1 | 1 | 0-3 |

CANCEL　OK

<CONSUMABLE-COMPONENT INFORMATION>

| GROUP 1 | GROUP 2 | GROUP 3 |

| CONSUMABLE-COMPONENT NAME | MODEL NUMBER | STATUS | NUMBER OF REMAINING DAYS |
|---|---|---|---|
| COMPONENT A-1 | TAK-1 | 0% | 0 DAYS |
| COMPONENT A-2 | TAK-2 | 5% | 7 DAYS |
| COMPONENT Z | MAY | 1% | 2 DAYS |

NUMBER OF REMAINING DAYS

[ 7 ]

FILTER WITH ABOVE NUMBER OF DAYS

[UPDATE]
[RESET]

[LIST DISPLAY] [OK]

FIG. 6B

<CONSUMABLE-COMPONENT INFORMATION LIST>

| GROUP | CONSUMABLE-COMPONENT NAME | MODEL NUMBER | STATUS | NUMBER OF REMAINING DAYS |
|---|---|---|---|---|
| 1 | COMPONENT A-1 | TAK-1 | 0% | 0 DAYS |
| 1 | COMPONENT A-2 | TAK-2 | 5% | 7 DAYS |
| 1 | COMPONENT Z | MAY | 1% | 2 DAYS |
| 2 | COMPONENT C | KEI-1 | 5% | 7 DAYS |

NUMBER OF REMAINING DAYS

[ 7 ]

FILTER WITH ABOVE NUMBER OF DAYS

[UPDATE]
[RESET]

< CONSUMABLE-COMPONENT INFORMATION >

| GROUP 1 | GROUP 2 | GROUP 3 |

| CONSUMABLE-COMPONENT NAME | MODEL NUMBER | STATUS | NUMBER OF REMAINING DAYS |
|---|---|---|---|
| COMPONENT A-1 | TAK-1 | 0% | 0 DAYS |
| COMPONENT A-2 | TAK-2 | 5% | 7 DAYS |
| COMPONENT A-3 | TAK-3 | 36% | 59 DAYS |
| COMPONENT A-4 | TAK-4 | 24% | 41 DAYS |
| COMPONENT Z | MAY | 1% | 2 DAYS |

< CONSUMABLE-COMPONENT INFORMATION >

| GROUP 1 | GROUP 2 | GROUP 3 |

| CONSUMABLE-COMPONENT NAME | MODEL NUMBER | STATUS | NUMBER OF REMAINING DAYS |
|---|---|---|---|
| COMPONENT A-1 | TAK-1 | 0% | 0 DAYS |
| COMPONENT Z | MAY | 1% | 2 DAYS |
| COMPONENT A-2 | TAK-2 | 5% | 7 DAYS |
| COMPONENT A-4 | TAK-4 | 24% | 41 DAYS |
| COMPONENT A-3 | TAK-3 | 36% | 59 DAYS |

OK

CONSUMABLE-COMPONENT MANAGEMENT APPARATUS, CONTROL METHOD, AND STORAGE MEDIUM STORING PROGRAM

BACKGROUND

Field

The present disclosure relates to a consumable-component management apparatus, a management method, and a program.

Description of the Related Art

Conventionally, there is a known technique of notifying, when a consumable component reaches the end of its life in an image forming apparatus, a user or a serviceman that the consumable component requires replacing. Japanese Patent Laid-Open No. 2007-268739 discloses a technique of issuing notification of replacement time for a plurality of consumable components having a remaining amount that has reached a predetermined value.

However, only issuing notification of a consumable component that has reached its replacement time, is insufficient to understand a specific replacement timing. Thus, for example, an appropriate schedule for order/dispatch of the consumable component is difficult to plan.

SUMMARY

An aspect of the present disclosure provides a consumable-component management apparatus that issues detail notification of replacement timing of a consumable component.

According to an aspect of the present disclosure a consumable-component management apparatus equipped with a plurality of consumable components includes a display configured to display information; and at least one controller configured to acquire a first value in units of days based on usage information regarding a first consumable component, acquire a second value in units of days based on usage information regarding a second consumable component, and cause the display to display a screen on which pieces of identification information regarding the plurality of consumable components are arranged, the screen being on which the identification information regarding the first consumable component is disposed in association with the first value and the identification information regarding the second consumable component is disposed in association with the second value, wherein an instruction object is disposed on the screen, the instruction object enabling a change in arrangement order between the identification information regarding the first consumable component and the identification information regarding the second consumable component based on a magnitude relationship between the first value and the second value.

Further features will become apparent from the following description of exemplary embodiments with reference to the attached drawings.

DESCRIPTION OF THE EMBODIMENTS

Embodiments will be described below based on the drawings.

First Embodiment

Figure 1:
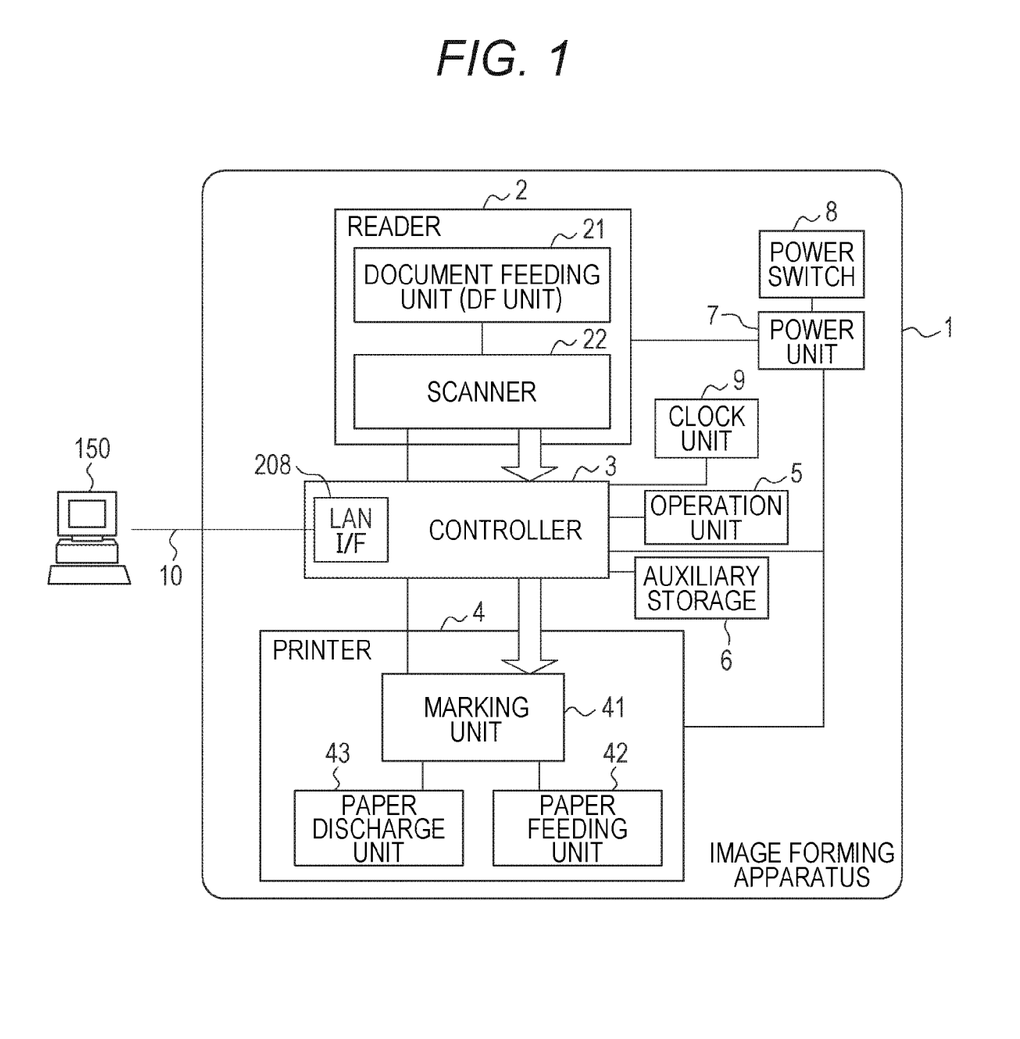
FIG. 1 is an entire block diagram of an image forming apparatus according to a first embodiment.

FIG. 1 is an entire block diagram of an image foil ling apparatus 1 according to a first embodiment. The image forming apparatus 1 includes a reader 2, a controller 3, a printer 4, an operation unit 5, an auxiliary storage 6, a power unit 7, a power switch 8, and a clock unit 9. The controller 3 controls the entire image forming apparatus 1 to perform various jobs. The reader 2 optically reads an image from a document, to convert the image into a digital image. The printer 4 outputs the digital image to a paper device. The operation unit 5 receives a user operation to the image forming apparatus 1. The auxiliary storage 6 stores, for example, the digital image and a control program. The power unit 7 controls power supply to the reader 2, the printer 4, and the controller 3. The image forming apparatus 1 enables, through a LAN 10, a computer 150 to perform, for example, input/output of a digital image, issue of a job, or an equipment instruction. The LAN and the controller are connected through a LAN I/F 208.

The reader 2 includes: a document feeding unit 21 that replaces a bundle of documents automatically sequentially; and a scanner 22 that optically scans a document to convert the document into a digital image. Image data converted by the scanner 22 is transmitted to the controller 3. The printer 4 includes: a marking unit 41 that prints the image data onto fed paper; a paper feeding unit 42 that sequentially feeds a bundle of paper one sheet by sheet; and a paper discharge unit 43 that discharges printed paper.

The marking unit 41 includes a hardware mechanism of forming an image onto, for example, a sheet of paper conveyed from the paper feeding unit 42. The marking unit 41 performs, for example, electrification to a drum, irradiation of a laser, forming of an electrostatic latent image, and transfer and fixing of an image to a sheet. The marking unit 41 includes a plurality of consumable components. The marking unit 41 includes, for example, a photoconductor drum on which an image is to be generated with charge and to which toner is to be adhered, and a fixing unit that fixes toner transferred to a sheet with heat and pressure. Examples of the consumable components include a toner bottle containing color-particle powder having an electrostatic property for image forming, a toner collecting container into which used toner in printing is to be collected, and a cylindrical photosensitive component. For the toner collecting container, detection of the amount of collected toner with an optical sensor enables calculation of the amount of remaining operation of the toner collecting container. For the toner bottle, the accumulation of the number of times of rotation of the bottle performed for conveyance of the toner or the number of times of the toner supplied to a developing unit is calculated as the amount of remaining operation. For the photoconductor drum or the fixing unit, the amount of remaining operation is calculated based on the accumulation of the number of times of image output.

Examples of the amount of remaining operation include the remaining amount of a consumable component, the rate of the remaining amount of the consumable component, and the number of remaining days the consumable component can be used. A value that can be converted into the amount of remaining operation can be referred to as the amount of remaining operation. The amount of operation is an example of the amount of remaining operation because subtracting the amount of operation from the amount of entire operation enables conversion to the amount of remaining operation.

The present embodiment exemplifies a case where a printer engine adopts an electrophotographic method as an image forming method and dry toner is used as a consumable material stored in a storage container. However, the present embodiment is not limited to the case. The printer engine can adopt, for example, an ink jet method of discharging ink to form an image on a sheet. In this case, the storage container stores the ink. Alternatively, a liquid development method can be adopted. In this case, a cartridge stores liquid toner. A case where the consumable material stored in the cartridge is dry toner (hereinafter, also referred to as tonner, simply), will be exemplarily described below. The image forming apparatus 1 manages consumable components installed in the image forming apparatus 1. That is, the image forming apparatus 1 is an exemplary consumable-component management apparatus. Note that, in the present embodiment, the image forming apparatus 1 includes a multi-function peripheral having a plurality of functions. However, the present embodiment is not limited to this, and thus a single-function printer can be provided.

Figure 2:
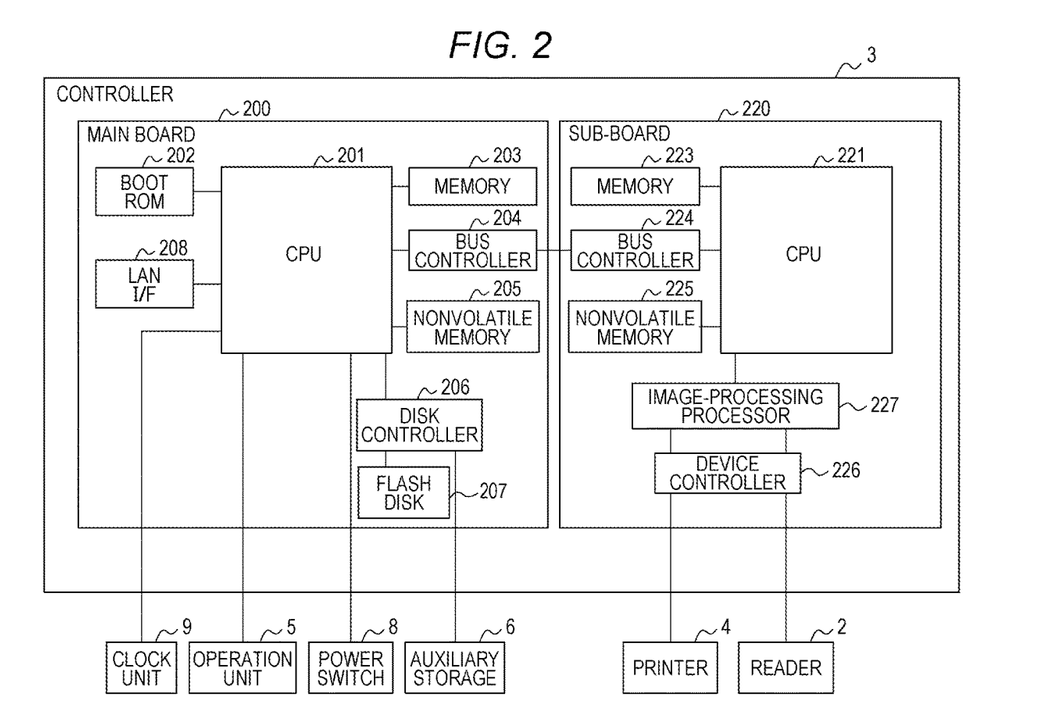
FIG. 2 is a hardware block diagram of a controller.

FIG. 2 is a hardware block diagram of the controller 3. The controller 3 includes a main board 200 and a sub-board 220. The main board 200 functions as a general-purpose computer. The main board 200 includes: a central processing unit (CPU) 201 that controls the entire board; a boot read only memory (ROM) 202; a memory 203; and a bus controller 204. The boot ROM 202 stores a boot program. The memory 203 is used as a work memory by the CPU 201. The bus controller 204 functions as a bridge to an external bus. The main board 200 includes a nonvolatile memory 205, a disk controller 206, a flash disk 207, and the LAN interface (I/F) 208. The disk controller 206 controls the storage. The flash disk 207 is a relatively small-capacity storage including a semiconductor device. The LAN I/F 208 performs network connection to the outside.

The operation unit 5 and the auxiliary storage 6 are, for example, connected to the main board 200. The operation unit 5 including, for example, a liquid crystal display having a touch panel function and various hardware keys, functions as a display that displays information and as a receiver that receives an instruction from a user.

The sub-board 220 is a sub-system including a relatively small general-purpose CPU system and image processing hardware. The sub-board 220 includes a CPU 221, a memory 223, a bus controller 224, a nonvolatile memory 225, an image-processing processor 227, and a device controller 226. The CPU 221 controls the entire sub-board 220. The memory 223 is used as a work memory by the CPU 221. The bus controller 224 functions as a bridge to an external bus. The nonvolatile memory 225 stores various types of information. The image-processing processor 227 performs real-time digital image processing.

The present diagram is simplified, and, for example, the CPU 201 and the CPU 221 each include a large number of pieces of CPU peripheral hardware, such as a chipset, a bus bridge, and a clock generator. The CPU 201 reads a program stored in, for example, the memory 203 or the nonvolatile memory 205 to execute the program, so that the function and processing of the image forming apparatus 1 to be described later, are achieved.

Figure 3:
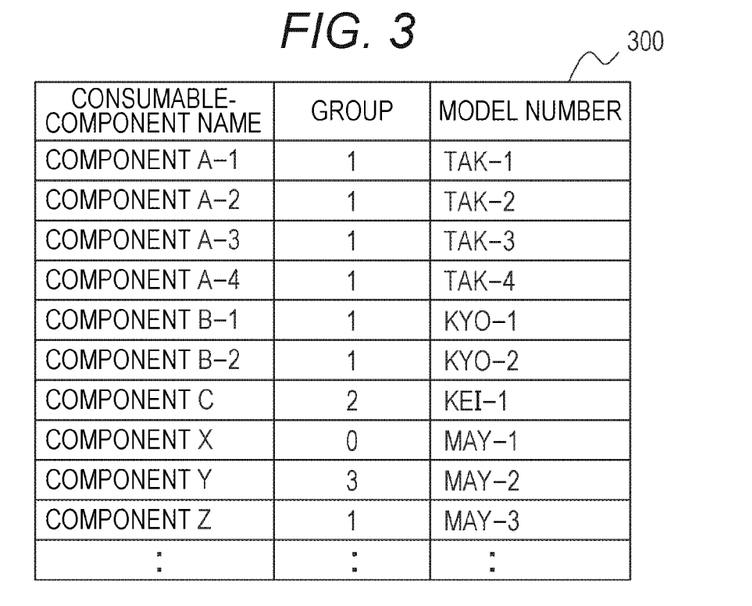
FIG. 3 illustrates an exemplary consumable-component table.

FIG. 3 illustrates an exemplary consumable-component table 300. The consumable-component table 300 stored in the nonvolatile memory 205, is managed by the CPU 201. The consumable-component table 300 stores consumable-component name, group, and model number in association with each other. Examples of the consumable components include the toner collecting container, the toner bottle, the photoconductor drum, and the fixing unit, similarly to the above. The group is determined based on, for example, a worker who replaces the consumable components or a contract mode of work. Any of groups 0 to 3 is set in the present embodiment. Here, the group 1 is to be replaced by general users. The group 2 is to be replaced by a serviceman who has the maintenance and management contract of the image forming apparatus 1. The group 3 is to be replaced by an equipment administrator in the general users. The group 0 including a consumable component not to be replaced, is not to be displayed by the operation unit.

Figure 4:
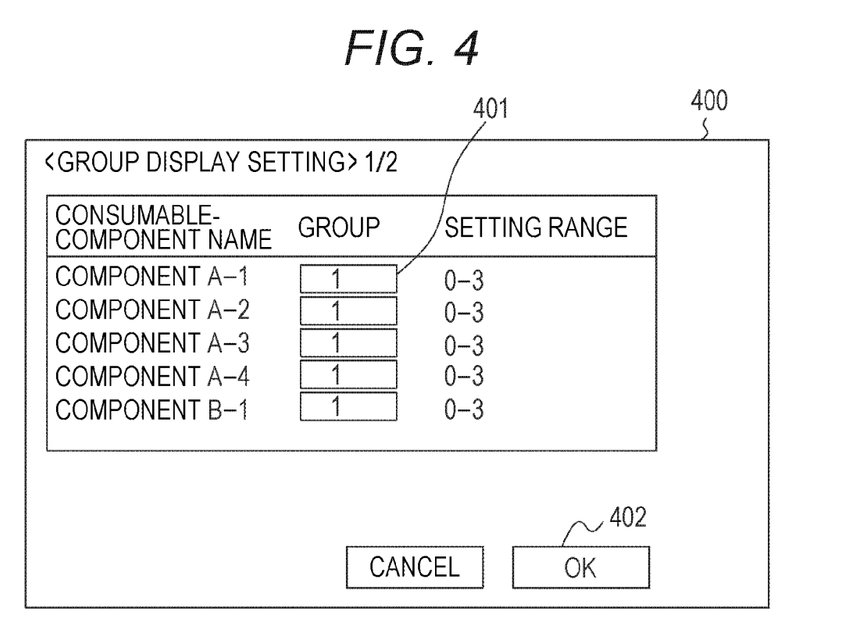
FIG. 4 illustrates an exemplary setting screen.

The group can be set or changed based on a user operation to the operation unit 5. FIG. 4 illustrates an exemplary setting screen 400. Input of a value of the group into a group setting field 401 and a press to an OK button 402 by a user operation on the setting screen 400, causes the CPU 201 to receive a setting instruction to set the group into the consumable-component table based on the setting instruction. The present processing is exemplary group-setting processing.

Figure 5:
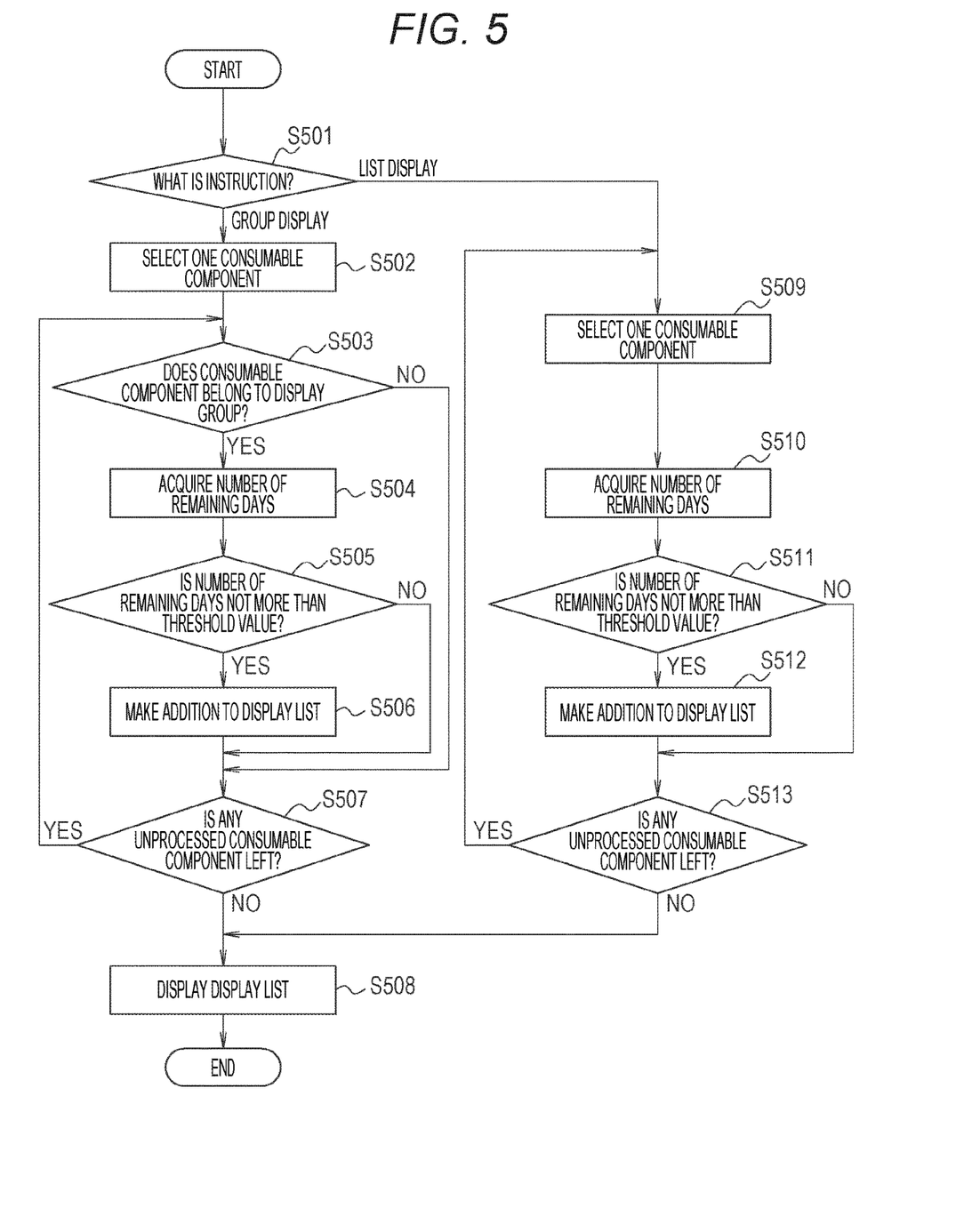
FIG. 5 is a flowchart of consumable-component information display processing.

FIG. 5 is a flowchart of consumable-component information display processing. A case where the amount of remaining operation is the number of remaining days will be exemplarily described in the present embodiment. However, the present embodiment is not limited to this. When receiving a consumable-component display instruction in response to a user operation, at S501, the CPU 201 determines whether the consumable-component display instruction is a group display instruction or a list display instruction. Here, the group display instruction includes information specifying a group, and is an execution instruction for processing of extracting a consumable component with the specified group as a target, to display information regarding the extracted consumable component. The list display instruction is an execution instruction for processing of extracting consumable components with all the groups as a target, to display information regarding the extracted consumable components. For the group display instruction (group display at S501), the CPU 201 causes the processing to proceed to S502. For the list display instruction (list display at S501), the CPU 201 causes the processing to proceed to S509. The group display instruction and the list display instruction each are an exemplary extraction instruction and an exemplary display instruction.

At S502, the CPU 201 selects one consumable component from the consumable-component table. Hereinafter, the selected consumable-component will be referred to as a target consumable-component. Next, at S503, the CPU 201 determines whether the target consumable component belongs to the specified group in the display instruction. In a case where the target consumable component belongs to the specified group (YES at S503), the CPU 201 causes the processing to proceed to S504. In a case where the target consumable component does not belong to the specified group (NO at S503), the CPU 201 finishes the processing for the target consumable component, to cause the processing to proceed to S507. For example, in a case where the specified group is the group 1 and the target consumable component is a component A-1, the processing proceeds to S504. In a case where the specified group is the group 1 and the target consumable component is a component C, the processing proceeds to S507.

At S504, the CPU 201 inquires of the printer 4 to acquire the number of remaining days of the target consumable component. Next, at S505, the CPU 201 determines whether the number of remaining days is a previously set threshold value or less. In a case where the number of remaining days is the threshold value or less (YES at S505), the CPU 201 causes the processing to proceed to S506. In a case where the number of remaining days is greater than the threshold value (NO at S505), the CPU 201 causes the processing to proceed to S507. At S506, the CPU 201 adds the consumable-component name, the model number, and the number of remaining days of the target consumable component, to a display list in the memory 203.

Next, at S507, the CPU 201 determines whether any unprocessed consumable component remains in the consumable-component table. In a case where any unprocessed consumable component remains (YES at S507), the CPU 201 causes the processing to proceed to S503. In this case, at S503, the CPU 201 selects the unprocessed consumable component and continues the processing. In a case where no unprocessed consumable component remains (NO at S507), the CPU 201 causes the processing to proceed to S508. At S508, the CPU 201 controls the operation unit 5 to display information regarding the registered consumable component in the display list. Then, the consumable-component information display processing finishes. The loop processing at S503 to S507 is processing of extracting a consumable component in which the amount of remaining operation is the threshold value or less, with the group according to the group display instruction as the target, and thus is exemplary extraction processing. The processing at S508 is exemplary display processing.

At S509, the CPU 201 selects one consumable component from the consumable-component table. Next, at S510, the CPU 201 inquires of the printer 4 to acquire the number of remaining days of the target consumable component. Next, at S511, the CPU 201 determines whether the number of remaining days is the previously set threshold value or less. In a case where the number of remaining clays is the threshold value or less (YES at S511), the CPU 201 causes the processing to proceed to S512. In a case where the number of remaining days is greater than the threshold value (NO at S511), the CPU 201 causes the processing to proceed to S513. At S512, the CPU 201 adds the consumable-component name, the model number, and the number of remaining days of the target consumable component, to a display list in the memory 203.

Next, at S513, the CPU 201 determines whether any unprocessed consumable component remains in the consumable-component table. In a case where any unprocessed consumable component remains (YES at S513), the CPU 201 causes the processing to proceed to S509. In this case, at S509, the CPU 201 selects the unprocessed consumable component and continues the processing. In a case where no unprocessed consumable component remains (NO at S513), the CPU 201 causes the processing to proceed to S508. The loop processing at S509 to S513 is processing of extracting a consumable component in which the amount of remaining operation is the threshold value or less, with all the groups as the target, and thus is exemplary extraction processing.

Figure 6A:
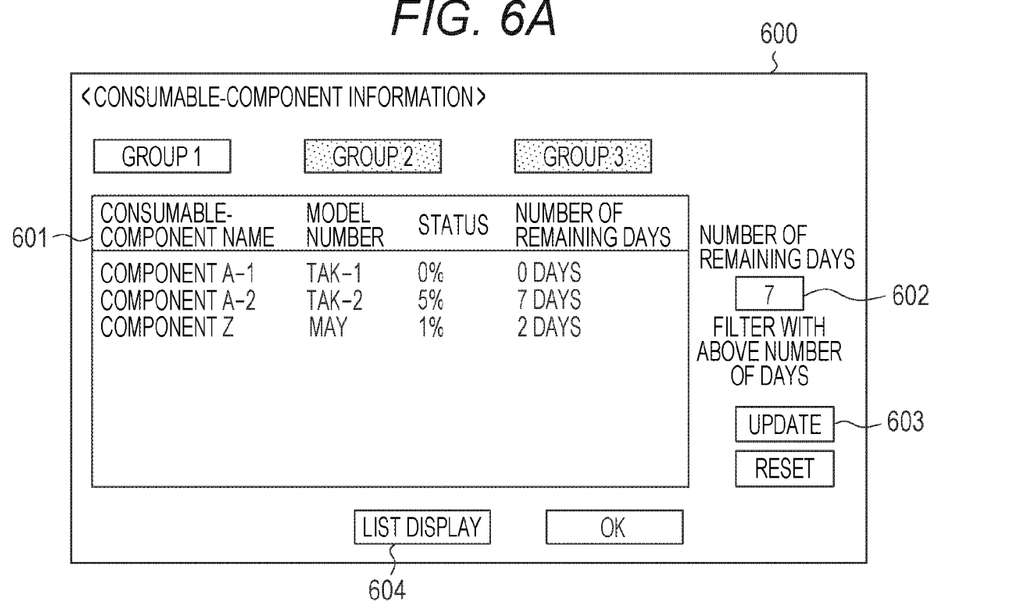
FIGS. 6A and 6B illustrate exemplary display screens.
Figure 6B:
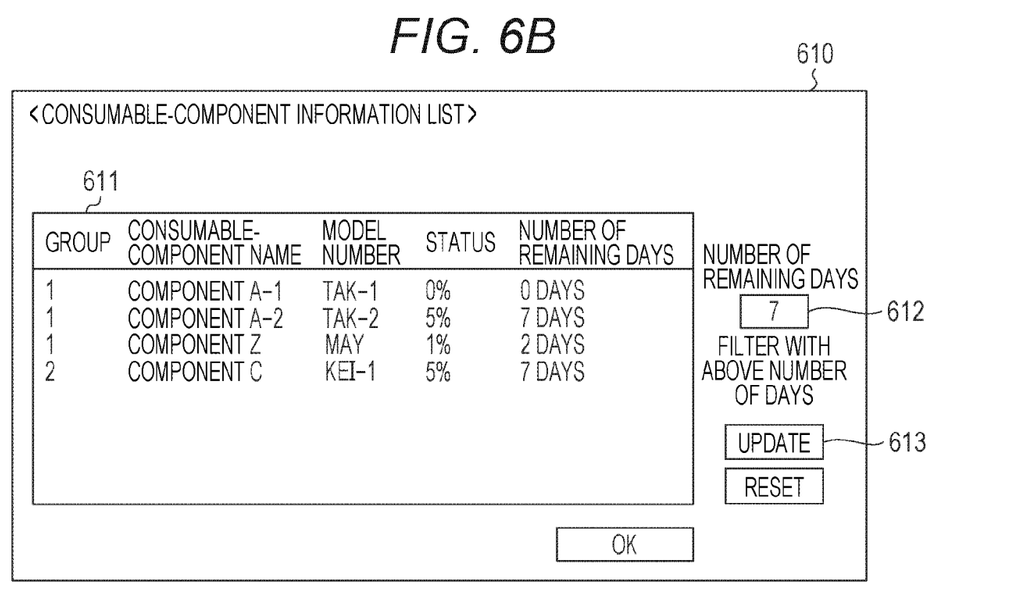

FIGS. 6A and 6B illustrate display examples of display lists. FIG. 6A illustrates an exemplary group display screen 600 displayed in response to a display instruction of the group display. The group display screen 600 displays a display list 601 responsive to a display instruction of the group 1. When the user sets the desired number of days into an input field 602 for the number of remaining days and then presses an update button 603, the CPU 201 changes (sets) the threshold value to be referred to at S505. The present processing is exemplary threshold-setting processing. When the user presses a list display button 604, the CPU 201 receives the list display instruction. As another example, the threshold value can be fixed and can be made so as not to be displayed.

FIG. 6B illustrates an exemplary list display screen 610 displayed in response to the list display instruction. The list display screen 610 displays a display list 611 of the consumable components included in the groups 0 to 3. On the present screen, when the user sets the desired number of days into an input field 612 for the number of remaining days and then presses an update button 613, the CPU 201 changes (sets) the threshold value to be referred to at S511.

As described above, in a case where receiving the group display instruction, the image forming apparatus 1 according to the first embodiment can display a consumable component requiring replacing, with the group based on the display instruction as the target. In a case where receiving the list display instruction, the image forming apparatus 1 can display a consumable component requiring replacing, with all the groups as the target. That is, the image forming apparatus 1 can provide the user with information for proper replacement of a consumable component. This arrangement enables the user to appropriately verify a consumable component requiring replacing, properly.

In the present embodiment, the image forming apparatus 1 with the group specified as the target by a user operation, displays the consumable-component information per group, but a group to be targeted can be any group.

Second Embodiment

Figure 7:
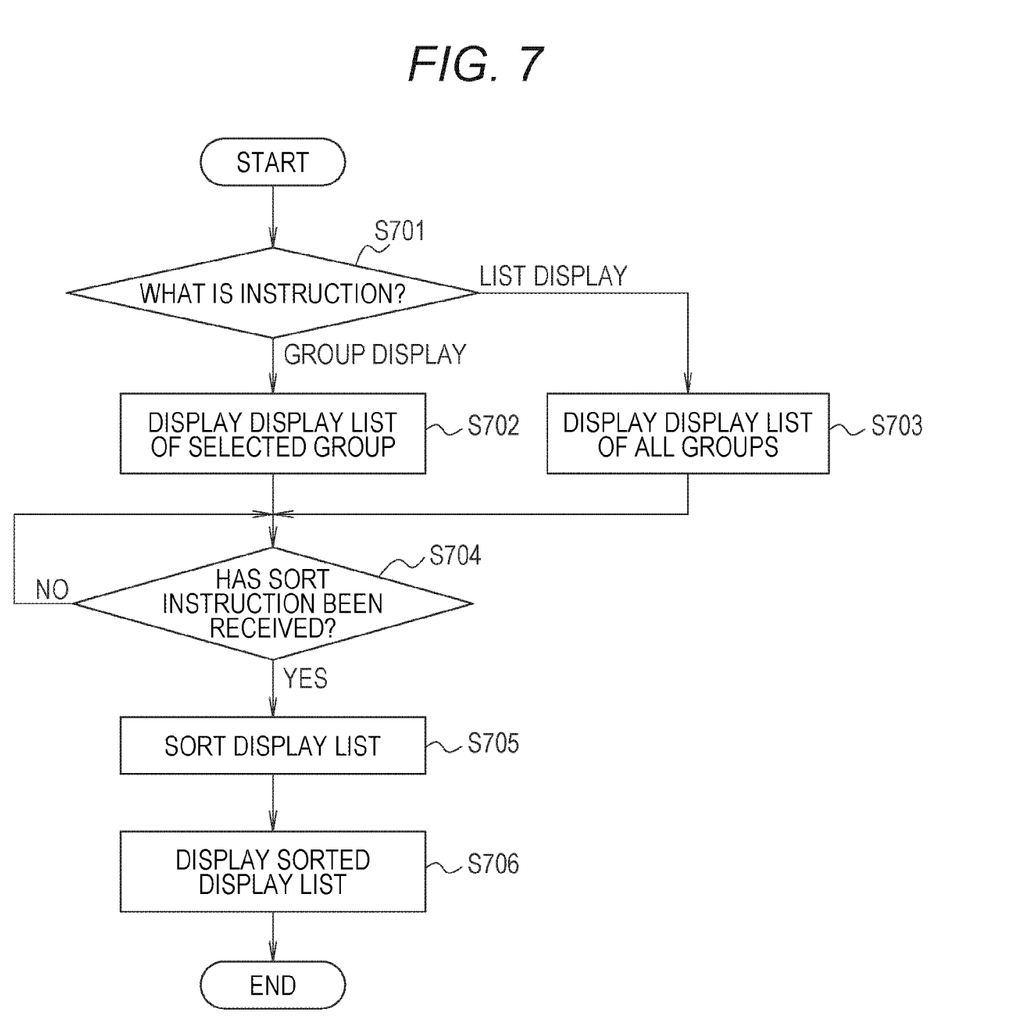
FIG. 7 is a flowchart of consumable-component information display processing according to a second embodiment.

Next, an image forming apparatus 1 according to a second embodiment will be described mainly regarding points different from those of the image forming apparatus 1 according to the first embodiment. FIG. 7 is a flowchart of consumable-component information display processing according to the second embodiment. At S701, a CPU 201 determines whether a consumable-component display instruction is a group display instruction or a list display instruction. For the group display instruction (group display at S701), the CPU 201 causes the processing to proceed to S702. For the list display instruction (list display at S701), the CPU 201 causes the processing to proceed to S703. At S702, the CPU 201 adds all consumable components in a selected group, to a display list, and then displays the display list. At S703, the CPU 201 adds consumable components belonging to all groups, namely, all the consumable components registered in a consumable-component table, to a display list, and then displays the display list.

After S702 and S703, the CPU 201 causes the processing to proceed to S704. At S704, the CPU 201 determines whether a sort instruction has been received. For example, a sort button 802 for ascending order (increasing order of the number of days) and descending order (decreasing order of the number of days) is displayed regarding the number of remaining days, in a display list 801 on a group display screen 800 illustrated in FIG. 8A. Then, in a case where the sort button 802 is pressed, the CPU 201 receives the sort instruction. Similarly, a sort button is displayed on a list display screen. In a case where receiving the sort instruction (YES at S704), the CPU 201 causes the processing to proceed to S705.

At S705, based on the sort instruction, the CPU 201 sorts the records of the consumable components included in the display list, with the number of remaining days as a key. In a case where the sort button is pressed for ascending order, the CPU 201 sorts the records of the consumable components in ascending order of the number of remaining days. In a case where the sort button is pressed for descending order, the CPU 201 sorts the records of the consumable components in descending order of the number of remaining days. Next, at S706, the CPU 201 controls the sorted display list to be displayed. The present processing is exemplary display processing. Then, the consumable-component information display processing finishes.

Figure 8A:
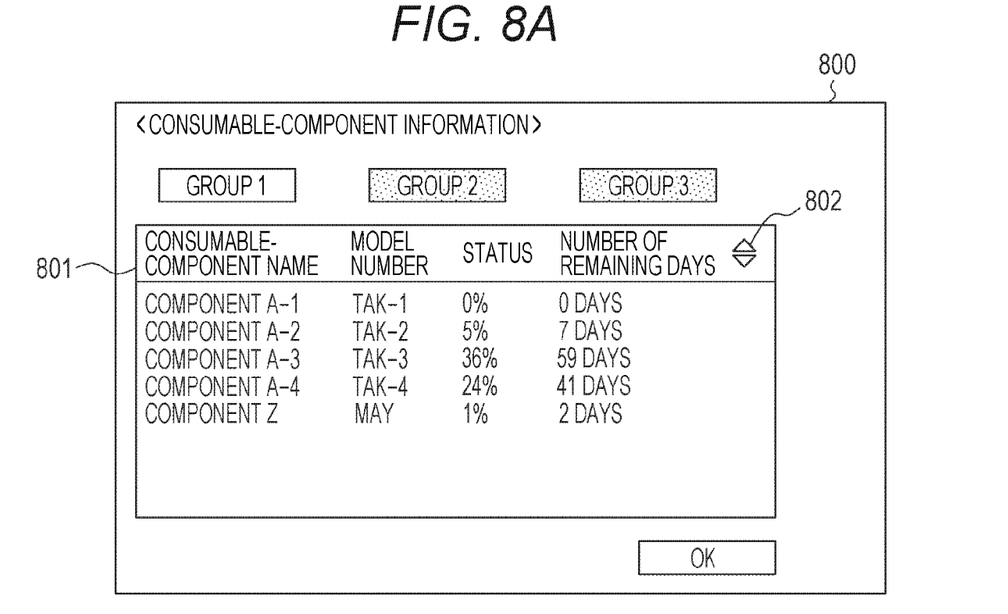
FIGS. 8A and 8B illustrate exemplary display screens.
Figure 8B:
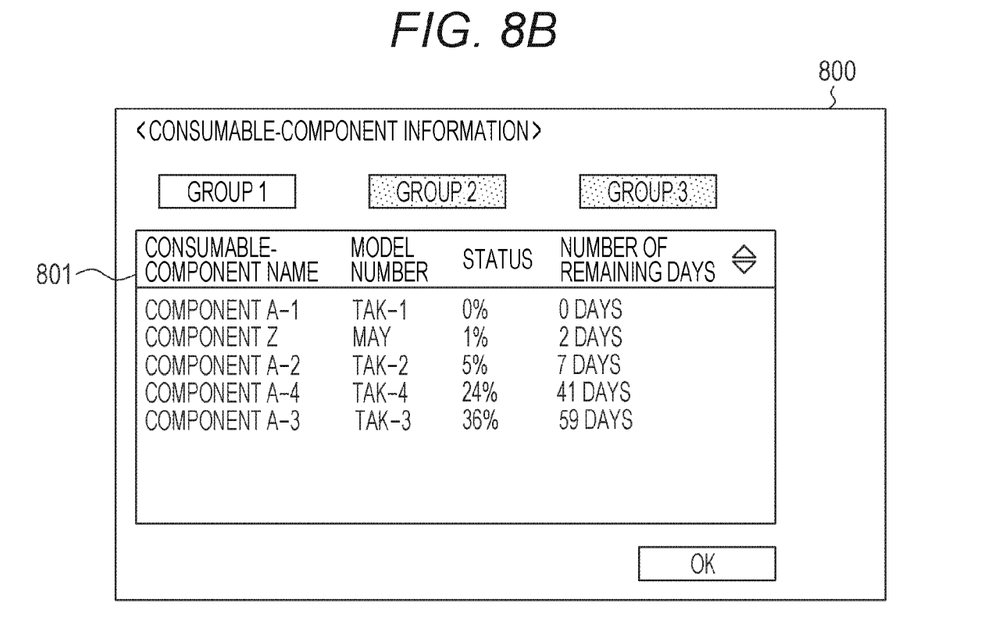

FIG. 8B illustrates the display list 801 sorted by a press of the sort button 802 for ascending order on the group display screen 800 illustrated in FIG. 8A. Thus, sorting in order of the number of remaining days enables a user to verify replacement times of the consumable components in order of the number of remaining days. Note that, except for the above, the configuration and processing of the image forming apparatus 1 according to the second embodiment are similar to the configuration and processing of the image forming apparatus 1 according to the first embodiment.

As a modification of the second embodiment, the image forming apparatus 1 with a threshold value as a reference, as described in the first embodiment, can indicate a consumable component in which the number of remaining days is the threshold value or less and a consumable component in which the number of remaining days is greater than the threshold value, in different display modes. Examples of the different display modes include changing characters in color and changing character lines in width.

Application of the consumable-component management apparatus is not limited to the image forming apparatus 1. For example, the consumable-component management apparatus serving as an apparatus independent of the image forming apparatus 1, can perform the above processing.

Instead of the image forming apparatus 1, the consumable-component management apparatus can perform control of displaying a consumable component, for example, in a 3D printer that generates a three-dimensional object with a consumable material, such as metal or resin, stored in a cartridge. Specific examples of the consumable component in the 3D printer include the consumed level of a shaping material, such as resin or metal, the consumed level of an auxiliary material used in order to retain the shape of a target, and a printhead. In a case where the present embodiment is applied to the 3D printer, preferably, for example, the consumable components described above are displayed on an operation unit 5, and display control is performed, such as filtering with the number of days or sorting every item, as described in each embodiment.

The consumable-component management apparatus can be applied to various products including consumable components. For example, the consumable-component management apparatus can be applied to display of consumable components in a motor vehicle. Examples of the consumable components in a motor vehicle include various oils, a brake friction pad, a tire, a plug, and a battery. The consumed level or the number of remaining days of each of the consumable components can be appropriately calculated based on travel distance or various sensors that monitor the consumable components, for example. In this case, the consumable-component management apparatus displays a list of the consumable components, for example, on an instrument panel provided at the driver's seat of the vehicle or on a display of a navigation system. The consumable-component management apparatus performs display control, such as filter processing with a threshold value for the number of remaining days or sorting every item.

The exemplary embodiments of the present disclosure have been described in detail above. However, the present disclosure is not limited to the described exemplary embodiments. Thus, various modifications and alterations can be made within the scope of the present disclosure.

Other Embodiments

Embodiments can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-033048, filed Feb. 27, 2018, which is hereby incorporated by reference herein in its entirety.

What is claimed is:

1. A removable-component management apparatus comprising:
a display configured to display information; and
at least one controller configured to:
  acquire a first number of days based on usage information of a first removable component;
  acquire a second number of days based on usage information of a second removable component; and
  cause the display to display a screen on which identification information of the first removable component, identification information of the second removable component, and
  an operation object are displayed,
  wherein, in a case where the operation object is operated by a user, on the screen,
    the identification information of the first removable component and the identification information of the second removable component are arranged based on the first number of days and the second number of days.

2. The removable-component management apparatus according to claim 1, wherein
the first number of days is a number of remaining days until a timing at which the first removable component is to be replaced, and
the second number of days is a number of remaining days until a timing at which the second removable component is to be replaced.

3. The removable-component management apparatus according to claim 1, wherein the first removable component and the second removable component are different types of removable components.

4. The removable-component management apparatus according to claim 1, wherein the identification information of the first removable component is a component name of the first removable component and the identification information of the second removable component is a component name of the second removable component.

5. The removable-component management apparatus according to claim 1, wherein the identification information of the first removable component is a model number of the first removable component and the identification information of the second removable component is a model number of the second removable component.

6. The removable-component management apparatus according to claim 1, wherein the at least one controller is further configured to:
cause the display to display, on a screen, identification information of a removable component which is associated with predetermined group information, among identification information of a plurality of removable components.

7. The removable-component management apparatus according to claim 6, wherein the at least one controller is further configured to:
display a screen enabling specification of the removable component to be associated with the predetermined group information.

8. The removable-component management apparatus according to claim 1, wherein the usage information is one or more of a sensor value of a sensor configured to detect a consumed level of the first removable component, a value indicating a driven amount of the first removable component, or a sensor value of a sensor configured to detect a remaining amount of a removable material.

9. The removable-component management apparatus according to claim 1, wherein the screen enables the user to input an instruction for display of identification information associated with a value meeting a predetermined condition among the pieces of identification information of a plurality of removable components.

10. The removable-component management apparatus according to claim 9, wherein the predetermined condition is a threshold value, and
the screen enables input of the threshold value.

11. The removable-component management apparatus according to claim 1, further comprising:
a printer configured to perform printing, wherein the printer consumes toner.

12. The information processing apparatus according to claim 1, wherein
the first number of days is a number of remaining days until a timing at which the first removable component is to be replaced, and
the second number of days is a number of remaining days until a timing at which the second removable component is to be replaced.

13. The information processing apparatus according to claim 1, wherein, in a case where the operation object is operated by a user, on the screen, the identification information of the first removable component and the identification information of the second removable component are arranged in an order based on the first number of days and the second number of days.

14. The information processing apparatus according to claim 1, wherein the first identification information is displayed with the acquired first number of days on the screen and the second identification information is displayed with the second number of days on the screen.

15. A control method of a removable-component management apparatus including a display configured to display information, the control method comprising:
acquiring a first number of days based on usage information of a first removable component;
acquiring a second number of days based on usage information of a second removable component; and
causing the display to display a screen on which of identification information of the first removable component, identification information of the second removable component, and
an operation object are displayed, and
wherein, in a case where the operation object is operated by a user, on the screen,
the identification information of the first removable component and the identification information of the second removable component are arranged based on the first number of days and the second number of days.

16. The control method according to claim 15,
wherein the first number of days is a number of remaining days until a timing at which the first removable component is to be replaced, and
the second number of days is a number of remaining days until a timing at which the second removable component is to be replaced.

17. The control method according to claim 15, wherein the first removable component and the second removable component are different removable component types.

18. The control method according to claim 15, wherein the identification information of the first removable component is a component name of the first removable component and the identification information of the second removable component is a component name of the second removable component.

19. The control method according to claim 15, wherein the identification information of the first removable component is a model number of the first removable component and the identification information of the second removable component is a model number of the second removable component.

20. The control method according to claim 15, further comprising causing the display to display, on a screen, identification information of a removable component which is associated with predetermined group information, among identification information of a plurality of removable components.

21. The control method according to claim 20, further comprising causing the display to display a screen enabling specification of the removable component to be associated with the predetermined group information.

22. The control method according to claim 15, wherein the usage information of the first removable component is one or more of a sensor value of a sensor configured to detect a consumed level of the first removable component, a value indicating a driven amount of the first removable component, or a sensor value of a sensor configured to detect a remaining amount of a removable material.

23. An information processing apparatus comprising:
a display configured to display information; and
at least one controller configured to:
acquire a first value indicating a remaining time of a running time of a first removable component;
acquire a second value indicating a remaining time of a running time of a second removable component; and
cause the display to display, on a screen, identification information of the first removable component, the first value, identification information of the second removable component, and the second value,
wherein, in a case where a predetermined operation is executed by a user, on the screen,
the identification information of the first removable component and the identification information of the second removable component are arranged based on the first value and the second value.

24. The information processing apparatus according to claim 23, wherein,
in a case where the predetermined operation is executed by the user, on the screen, the identification information of the first removable component and the identification information of the second removable component are arranged in ascending order or descending order.

25. The information processing apparatus according to claim 23, wherein,
in a case where a threshold value about remaining time is input by the user, identification information of a removable component of which remaining time of a running time is shorter than the threshold is displayed on the screen and identification information of a removable component of which remaining time of a running time is longer than the threshold value is not displayed on the screen.

26. The information processing apparatus according to claim 23, wherein,
the predetermined operation is an instruction to sort identification information of removable components.

* * * * *